United States Patent
Malladi et al.

(10) Patent No.: US 12,411,767 B2
(45) Date of Patent: Sep. 9, 2025

(54) COHERENT MEMORY SYSTEM

(71) Applicant: Samsung Electronics Co., Ltd., Suwon-si (KR)

(72) Inventors: Krishna T. Malladi, San Jose, CA (US); Andrew Z Chang, Los Altos, CA (US); Ehsan Najafabadi, Duluth, GA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

(21) Appl. No.: 17/372,309

(22) Filed: Jul. 9, 2021

(65) Prior Publication Data

US 2022/0358042 A1 Nov. 10, 2022

Related U.S. Application Data

(60) Provisional application No. 63/185,842, filed on May 7, 2021.

(51) Int. Cl.
*G06F 12/08* (2016.01)
*G06F 12/0817* (2016.01)

(52) U.S. Cl.
CPC .... *G06F 12/0828* (2013.01); *G06F 2212/621* (2013.01)

(58) Field of Classification Search
CPC .............. G06F 12/0828; G06F 2212/621
See application file for complete search history.

(56) References Cited

U.S. PATENT DOCUMENTS

| | | | |
|---|---|---|---|
| 9,235,519 B2 | 1/2016 | Lih et al. | |
| 9,483,318 B2 | 11/2016 | Vajapeyam | |
| 9,916,241 B2 | 3/2018 | McKean et al. | |
| 2004/0136393 A1* | 7/2004 | Riveiro Insua | H04L 5/0046 370/432 |
| 2006/0092957 A1* | 5/2006 | Yamazaki | G06F 12/0835 370/402 |
| 2013/0262736 A1* | 10/2013 | Kegel | G06F 12/1081 711/3 |
| 2013/0318308 A1 | 11/2013 | Jayasimha et al. | |
| 2016/0267209 A1 | 9/2016 | Ikram et al. | |
| 2016/0321012 A1* | 11/2016 | Clark | G06F 3/067 |
| 2017/0194053 A1* | 7/2017 | Micheloni | G11C 5/005 |
| 2020/0104275 A1 | 4/2020 | Sen et al. | |

(Continued)

OTHER PUBLICATIONS

W. Cheong et al., "A flash memory controller for 15 μs ultra-low-latency SSD using high-speed 3D Nand flash with 3 μs read time," 2018 IEEE International Solid—State Circuits Conference—(ISSCC), 2018, pp. 338-340.*

(Continued)

*Primary Examiner* — Pierre Michel Bataille
(74) *Attorney, Agent, or Firm* — Lewis Roca Rothgerber Christie LLP

(57) ABSTRACT

A coherent memory system. In some embodiments, the coherent memory system includes a first memory device. The first memory device may include a cache coherent controller; a volatile memory controller; a volatile memory; a nonvolatile memory controller; and a nonvolatile memory. The first memory device may be configured to receive a quality of service requirement and to selectively enable a first feature in response to the quality of service requirement.

18 Claims, 12 Drawing Sheets

(56) References Cited

U.S. PATENT DOCUMENTS

| | | | |
|---|---|---|---|
| 2020/0125503 A1* | 4/2020 | Graniello | G06F 13/1678 |
| 2020/0150734 A1* | 5/2020 | Ma | G06F 1/3243 |
| 2020/0278935 A1* | 9/2020 | Borikar | G06F 12/1027 |
| 2020/0322287 A1 | 10/2020 | Connor et al. | |
| 2020/0327088 A1* | 10/2020 | Choudhary | G06F 13/4221 |
| 2020/0371953 A1 | 11/2020 | Guo et al. | |
| 2021/0011864 A1* | 1/2021 | Guim Bernat | G06F 12/08333 |
| 2021/0014324 A1* | 1/2021 | Chilikin | G06F 12/0862 |
| 2021/0091984 A1* | 3/2021 | Kuchi | H04B 1/1027 |
| 2021/0117249 A1 | 4/2021 | Doshi et al. | |
| 2021/0117334 A1* | 4/2021 | Guim Bernat | G06F 12/0882 |
| 2021/0117340 A1 | 4/2021 | Trikalinou et al. | |
| 2021/0209035 A1* | 7/2021 | Galbi | G06F 13/1657 |
| 2021/0278998 A1* | 9/2021 | Li | G06F 12/0246 |
| 2021/0311643 A1* | 10/2021 | Shanbhogue | G06F 3/0679 |
| 2021/0311900 A1* | 10/2021 | Malladi | G06F 13/4027 |
| 2021/0374056 A1* | 12/2021 | Malladi | G06F 13/4234 |
| 2022/0014588 A1* | 1/2022 | Guim Bernat | G06F 12/0831 |

OTHER PUBLICATIONS

A. Awad, B. Kettering and Y. Solihin, "Non-volatile memory host controller interface performance analysis in high-performance I/O systems," 2015 IEEE International Symposium on Performance Analysis of Systems and Software (ISPASS), 2015, pp. 145-154.*

A. Charlesworth, "The Sun Fireplane System Interconnect," SC '01: Proceedings of the 2001 ACM/IEEE Conference on Supercomputing, Denver, Co, USA, 2001, pp. 2-2.*

Shantharama, Prateek, et al., "Hardware-Accelerated Platforms and Infrastructures for Network Functions: A Survey of Enabling Technologies and Research Studies," IEEE Access, IEEE, vol. 8, Jul. 2020, pp. 132021-132085.

EPO Extended European Search Report dated Oct. 10, 2022, issued in corresponding European Patent Application No. 22171332.4 (8 pages).

Gurumurthi, Sudhnva, et al., "An Overview of Reliability, Availability, and Serviceability (RAS) in Compute Express Link(TM) 2.0," Compute Express Link, Jan. 30, 2021, XP093169375, 18 pages, Retrieved from the Internet: URL:https://www.academia.edu/45413748/Compute_Express_Link_RAS?email_work_card=thumbnail.

EPO European Office Action dated Oct. 28, 2024, issued in corresponding European Patent Application No. 22171332.4 (6 pages).

Korean Office Action dated Nov. 26, 2024, issued in corresponding Korean Patent Application No. 10-2022-0042144 (8 pages).

* cited by examiner

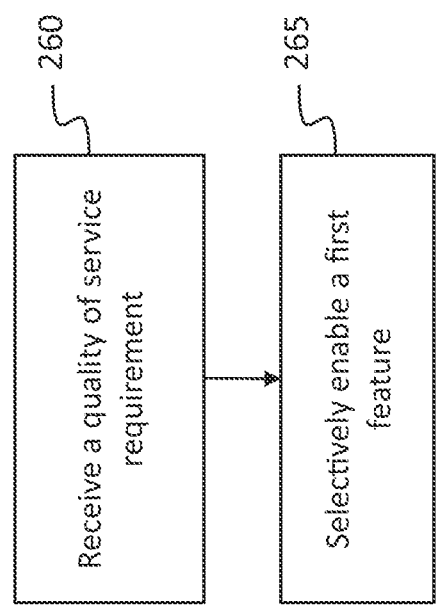

COHERENT MEMORY SYSTEM

CROSS-REFERENCE TO RELATED APPLICATION(S)

The present application claims priority to and the benefit of U.S. Provisional Application No. 63/185,842, filed May 7, 2021, entitled "ASSISTING LARGE COHERENT MEMORY SYSTEMS", the entire content of which is incorporated herein by reference.

FIELD

One or more aspects of embodiments according to the present disclosure relate to storage systems, and more particularly to memory systems using a cache coherent interface.

BACKGROUND

Computing systems with large distributed memories may benefit from the use of cache coherent protocols in connections between compute resources and memory or storage resources. Such systems, however, may face various challenges, including, for example, potentially long boot times, relatively high translation lookaside buffer (TLB) miss rates, and connections that may not have high reliability and that may not be order-preserving.

Thus, there is a need for improved components in computing systems with large distributed memories and cache coherent connections. The present background section is intended only to provide context, and is not a description of prior art.

SUMMARY

In some embodiments, certain challenges of large distributed memory systems can be addressed or mitigated by the incorporation, in a memory device, of certain features, including (i) a memory management unit (MMU) cache, to assist the performance of a translation lookaside buffer (TLB) of the host, (ii) features for handling the ordering of read and write operations, and the possibility that they may arrive at a memory device in an order that differs from the order in which they were issued (iii) features for meeting quality of service (QoS) requirements, (iv) CXL interleaving, including interleaving physical memory addresses from multiple memory devices in a contiguous set of virtual memory addresses, (v) the use of error correction code (ECC), (vi) support for integrity and data encryption (IDE), and (vii) multiple logical device (MLD) support.

According to an embodiment of the present disclosure, there is provided a system, including: a first memory device, the first memory device including: a cache coherent controller; a volatile memory controller; a volatile memory; a nonvolatile memory controller; and a nonvolatile memory, wherein the first memory device is configured: to receive a quality of service requirement; and to selectively enable a first feature in response to the quality of service requirement.

In some embodiments: the first feature includes the providing of a memory management unit cache; and the first memory device is configured to: allocate a portion of the volatile memory as the memory management unit cache, and perform a physical address lookup, in the memory management unit cache, of a physical address, based on a virtual address.

In some embodiments, the performing of the physical address lookup includes: looking up a base address, in a first page table of the memory management unit cache, based on a first portion of the virtual address; determining a starting address of a second page table of the memory management unit cache based on the base address; and looking up the physical address in the second page table, based on a second portion of the virtual address.

In some embodiments, the system further includes a host, wherein: the host includes: a memory management unit, and a translation lookaside buffer; and the host is configured to request, from the first memory device, the physical address lookup.

In some embodiments, the first memory device is further configured: to receive: a first IO request, the first IO request including a first time tag indicating a time of issuance of the first IO request, and a second IO request, the second IO request including a time tag indicating a time of issuance of the second IO request; and to execute: the second IO request, and the first IO request, wherein the time tag of the second IO request is less than the first time tag of the first IO request.

In some embodiments, the first IO request further includes a second time tag indicating a time of processing of the first IO request by a switch.

In some embodiments: the first memory includes a first media type; and the first memory device is further configured to report, through the cache coherent controller, a load value for the volatile memory.

In some embodiments: the volatile memory is mapped to a first logical device, the nonvolatile memory is mapped to a second logical device, and the first memory device is further configured to report, through the cache coherent controller, a load value for the nonvolatile memory.

In some embodiments, the system further includes a second memory device, wherein: the first memory device is configured to store: data having a first physical address, and data having a second physical address; and the second memory device is configured to store: data having a third physical address, the third physical address being greater than the first physical address and less than the second physical address.

In some embodiments, the first memory device is further configured to: receive a read request; read raw data from a first page of the first memory; decode the raw data, with an error correcting code; determine that a number of errors corrected exceeds a threshold; and send, through the cache coherent controller, a report requesting retirement of the first page.

In some embodiments, the first memory device is further configured to: receive a write request including unencrypted data; encrypt the unencrypted data to form encrypted data; and store the encrypted data in the nonvolatile memory.

In some embodiments, the first memory device is further configured to: receive a read request; read encrypted data from the nonvolatile memory; decrypt the encrypted data to form unencrypted data; and transmit the unencrypted data through the cache coherent controller.

In some embodiments, the cache coherent controller is a Compute Express Link (CXL) controller.

In some embodiments, the first memory device is a Type-3 CXL device.

According to an embodiment of the present disclosure, there is provided a method, including: receiving, by a first memory device, a quality of service requirement; and selectively enabling a first feature in response to the quality of service requirement, wherein the first memory device includes: a cache coherent controller; a volatile memory controller; a volatile memory; a nonvolatile memory controller; and a nonvolatile memory.

In some embodiments, the system further includes: allocating, by the first memory device, a portion of the volatile memory as a memory management unit cache; and performing, by the first memory device, a lookup, in the memory management unit cache, of a physical address, based on a virtual address.

In some embodiments, the performing of the lookup includes: looking up a base address, in a first page table of the memory management unit cache, based on a first portion of the virtual address; determining a starting address of a second page table of the memory management unit cache based on the base address; and looking up the physical address in the second page table, based on a second portion of the virtual address.

In some embodiments, the system further includes: receiving: a first IO request, the first IO request including a first time tag indicating a time of issuance of the first IO request, and a second IO request, the second IO request including a time tag indicating a time of issuance of the second IO request; and executing: the second IO request, and the first IO request, wherein the time tag of the second IO request is less than the first time tag of the first IO request.

In some embodiments, the first IO request further includes a second time tag indicating a time of processing of the first IO request by a switch. According to an embodiment of the present disclosure, there is provided a system, including: a first memory device, the first memory device including: means for data storage, and a cache coherent host interface, the first memory device being configured to: allocate a portion of the means for data storage as a memory management unit cache; and perform a lookup, in the memory management unit cache, of a physical address, based on a virtual address.

BRIEF DESCRIPTION OF THE DRAWINGS

These and other features and advantages of the present disclosure will be appreciated and understood with reference to the specification, claims, and appended drawings wherein:

FIG. 2B is a flowchart of a method according to an embodiment of the present disclosure;

Figure 1A:
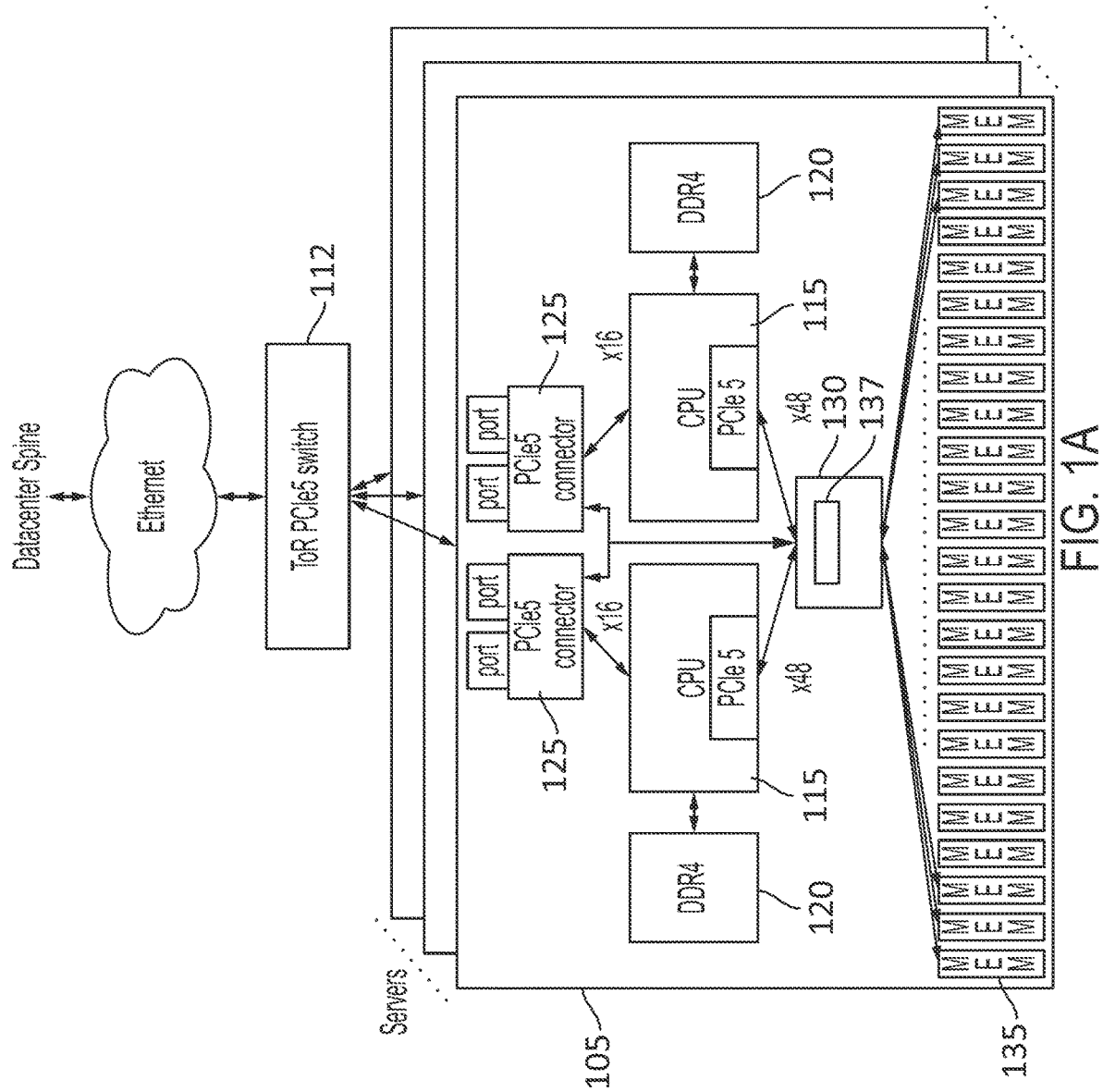
FIG. 1A is a block diagram of a computing system with a plurality of servers and a plurality of memory devices, according to an embodiment of the present disclosure.

The drawings are nonlimiting examples only, and the scope of the claims and of the invention extends beyond the features shown in the drawings.

DETAILED DESCRIPTION

The detailed description set forth below in connection with the appended drawings is intended as a description of exemplary embodiments of a coherent memory system provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In computing systems with hyperscale workload requirements, workloads may exhibit diversity in memory and IO latency and bandwidth needs, and compute and memory resources may be constrained. In systems using Compute Express Link (CXL) connections, CXL may enable new types of memory extensions and coherent accelerators. Distributed and large CXL memory systems may pose certain challenges, however, including, for example, potentially long boot times, relatively high translation lookaside buffer (TLB) miss rates, and connections that may not have high reliability and that may not be order-preserving.

In some embodiments, such challenges can be addressed or mitigated by the incorporation, in a Type-3 memory device, of certain features, including (i) a memory management unit (MMU) cache, to assist the performance of a translation lookaside buffer (TLB) of the host, (ii) features for handling the ordering of read and write operations, and the possibility that they may arrive at a memory device in an order that differs from the order in which they were issued (iii) features for meeting quality of service (QoS) requirements, (iv) interleaving with a cache coherent protocol such as CXL, including interleaving physical memory addresses from multiple memory devices in a contiguous set of virtual memory addresses, (v) the use of error correction code (ECC), (vi) support for integrity and data encryption (IDE), and (vii) multiple logical device (MLD) support.

Peripheral Component Interconnect Express (PCIe) can refer to a computer interface which may have a relatively high and variable latency that can limit its usefulness in making connections to memory. CXL is an open industry standard for communications over PCIe 5.0, which can provide fixed, relatively short packet sizes, and, as a result, may be able to provide relatively high bandwidth and relatively low, fixed latency. As such, CXL may be capable of supporting cache coherence and CXL may be well suited for making connections to memory. CXL may further be used to provide connectivity between a host and accelerators, memory devices, and network interface circuits (or "network interface controllers" or "network interface cards" (NICs)) in a server.

Cache coherent protocols such as CXL may also be employed for heterogeneous processing, e.g., in scalar, vector, and buffered memory systems. CXL may be used to leverage the channel, the retimers, the PHY layer of a system, the logical aspects of the interface, and the protocols from PCIe 5.0 to provide a cache coherent interface. The CXL transaction layer may include three multiplexed sub-protocols that run simultaneously on a single link and can be referred to as CXL.io, CXL.cache, and CXL.memory. CXL.io may include I/O semantics, which may be similar to PCIe. CXL.cache may include caching semantics, and CXL.memory may include memory semantics; both the caching semantics and the memory semantics may be optional. Like PCIe, CXL may support (i) native widths of ×16, ×8, and ×4, which may be partitionable, (ii) a data rate of 32 GT/s, degradable to 8 GT/s and 16 GT/s, 128b/130b, (iii) 300 W (75 W in a ×16 connector), and (iv) plug and play. To support plug and play, either a PCIe or a CXL device link may start training in PCIe in Gen1, negotiate CXL, complete Gen 1-5 training and then start CXL transactions.

In some embodiments, the use of CXL connections to an aggregation, or "pool", of memory (e.g., a quantity of memory, including a plurality of memory cells connected together) may provide various advantages, in a system that includes a plurality of servers connected together by a network, as discussed in further detail below. For example, a CXL switch having further capabilities in addition to providing packet-switching functionality for CXL packets (referred to herein as an "enhanced capability CXL switch") may be used to connect the aggregation of memory to one or more central processing units (CPUs) (or "central processing circuits") and to one or more network interface circuits (which may have enhanced capability). Such a configuration may make it possible (i) for the aggregation of memory to include various types of memory, having different characteristics, (ii) for the enhanced capability CXL switch to virtualize the aggregation of memory, and to store data of different characteristics (e.g., frequency of access) in appropriate types of memory, (iii) for the enhanced capability CXL switch to support remote direct memory access (RDMA) so that RDMA may be performed with little or no involvement from the server's processing circuits. As used herein, to "virtualize" memory means to perform memory address translation between the processing circuit and the memory.

A CXL switch may (i) support memory and accelerator dis-aggregation through single level switching, (ii) enable resources to be off-lined and on-lined between domains, which may enable time-multiplexing across domains, based on demand, and (iii) support virtualization of downstream ports. CXL may be employed to implement aggregated memory, which may enable one-to-many and many-to-one switching (e.g., it may be capable of (i) connecting multiple root ports to one end point, (ii) connecting one root port to multiple end points, or (iii) connecting multiple root ports to multiple end points), with aggregated devices being, in some embodiments, partitioned into multiple logical devices each with a respective LD-ID (logical device identifier). In such an embodiment a physical device may be partitioned into a plurality of logical devices, each visible to a respective initiator. A device may have one physical function (PF) and a plurality (e.g., 16) of isolated logical devices. In some embodiments the number of logical devices (e.g., the number of partitions) may be limited (e.g. to 16), and one control partition (which may be a physical function used for controlling the device) may also be present.

Referring to FIG. 1A, in some embodiments, a server system includes a plurality of servers 105, each connected to a ToR server-linking switch 112, which may be a PCIe 5.0 CXL switch, having PCIe capabilities, as illustrated. Each server includes one or more processing circuits 115, each connected to (i) system memory 120 (e.g., Double Data Rate (version 4) (DDR4) memory or any other suitable memory), (ii) one or more network interface circuits 125, and (iii) one or more CXL memory devices 135. Each of the processing circuits 115 may be a stored-program processing circuit, e.g., a central processing unit (CPU) (e.g., an x86 CPU), a graphics processing unit (GPU), or an ARM processor. In some embodiments a network interface circuit 125 may be embedded in (e.g., on the same semiconductor chip as, or in the same module as) one of the memory devices 135, or a network interface circuit 125 may be separately packaged from the memory devices 135. Although some embodiments are described herein as using the CXL protocol (and corresponding components, such as a CXL controller), the present disclosure is not limited to CXL, and in other embodiments a different cache coherent protocol, and corresponding components, such as cache coherent controller for such a protocol, are used.

As used herein, a "memory device" is a circuit (e.g., a circuit including a printed circuit board and components connected to it, or an enclosure including a printed circuit board) including one or more memory dies, each memory die including a plurality of memory cells. Each memory die, or each of a set of groups of memory dies, may be in a package (e.g., an epoxy mold compound (EMC) package) soldered to the printed circuit board of the memory device (or connected to the printed circuit board of the memory device through a connector). Each of the memory devices 135 may have a CXL interface and may include a controller 137 (e.g., an FPGA, an ASIC, a processor, and/or the like) for translating between CXL packets and the memory interface of the memory dies, e.g., the signals suitable for the memory technology of the memory in the memory device 135. As used herein, the "memory interface" of the memory dies is the interface that is native to the technology of the memory dies, e.g., in the case of DRAM e.g., the memory interface may be word lines and bit lines. A memory device may also include a controller 137 which may provide enhanced capabilities, as described in further detail below. The controller 137 of each memory devices 135 may be connected to a processing circuit 115 through a cache coherent interface, e.g., through the CXL interface. The controller 137 may also facilitate data transmissions (e.g., RDMA requests) between different servers 105, bypassing the processing circuits 115. The ToR Ethernet switch 110 and the network interface circuits 125 may include an RDMA interface to facilitate RDMA requests between CXL memory devices on different servers (e.g., the ToR Ethernet switch 110 and the network interface circuits 125 may provide hardware offload or hardware acceleration of RDMA over Converged Ethernet (RoCE), Infiniband, and iWARP packets).

The server-linking switch 112 may include an FPGA or ASIC, and may provide performance (in terms of throughput and latency) superior to that of an Ethernet switch. Each of the servers 105 may include a plurality of memory devices 135 connected to the server-linking switch 112 through the enhanced capability CXL switch 130 and through a plurality of PCIe connectors. Each of the servers 105 may also include one or more processing circuits 115, and system memory 120, as shown. The server-linking switch 112 may operate as a master, and each of the enhanced capability CXL switches 130 may operate as a slave, as discussed in further detail below.

Figure 1B:
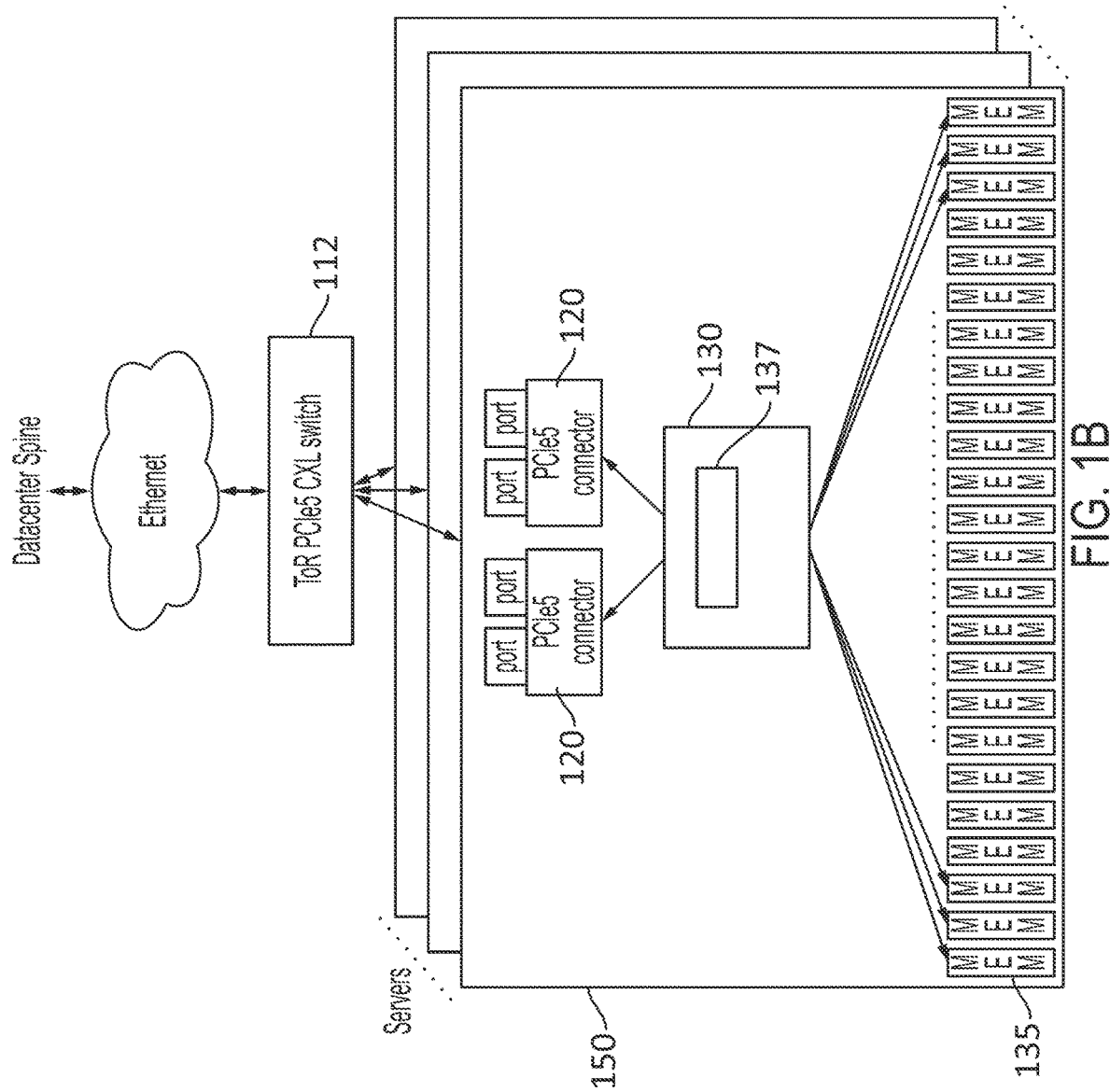
FIG. 1B is a block diagram of a plurality of memory servers each including a plurality of memory devices, according to an embodiment of the present disclosure.

FIG. 1B shows an embodiment in which each of a plurality of memory servers 150 is connected to a ToR server-linking switch 112, which may be a PCIe 5.0 CXL switch, as illustrated. As in the embodiment of FIG. 1A, the server-linking switch 112 may include an FPGA or ASIC, and may provide performance (in terms of throughput and latency) superior to that of an Ethernet switch. As in the embodiment of FIG. 1A, the memory server 150 may include a plurality of memory devices 135 connected to the server-linking switch 112 through a plurality of PCIe connectors. In the embodiment of FIG. 1B, the processing circuits 115 and system memory 120 may be absent, and the primary purpose of the memory server 150 may be to provide memory, for use by other servers 105 having computing resources.

Figure 2A:
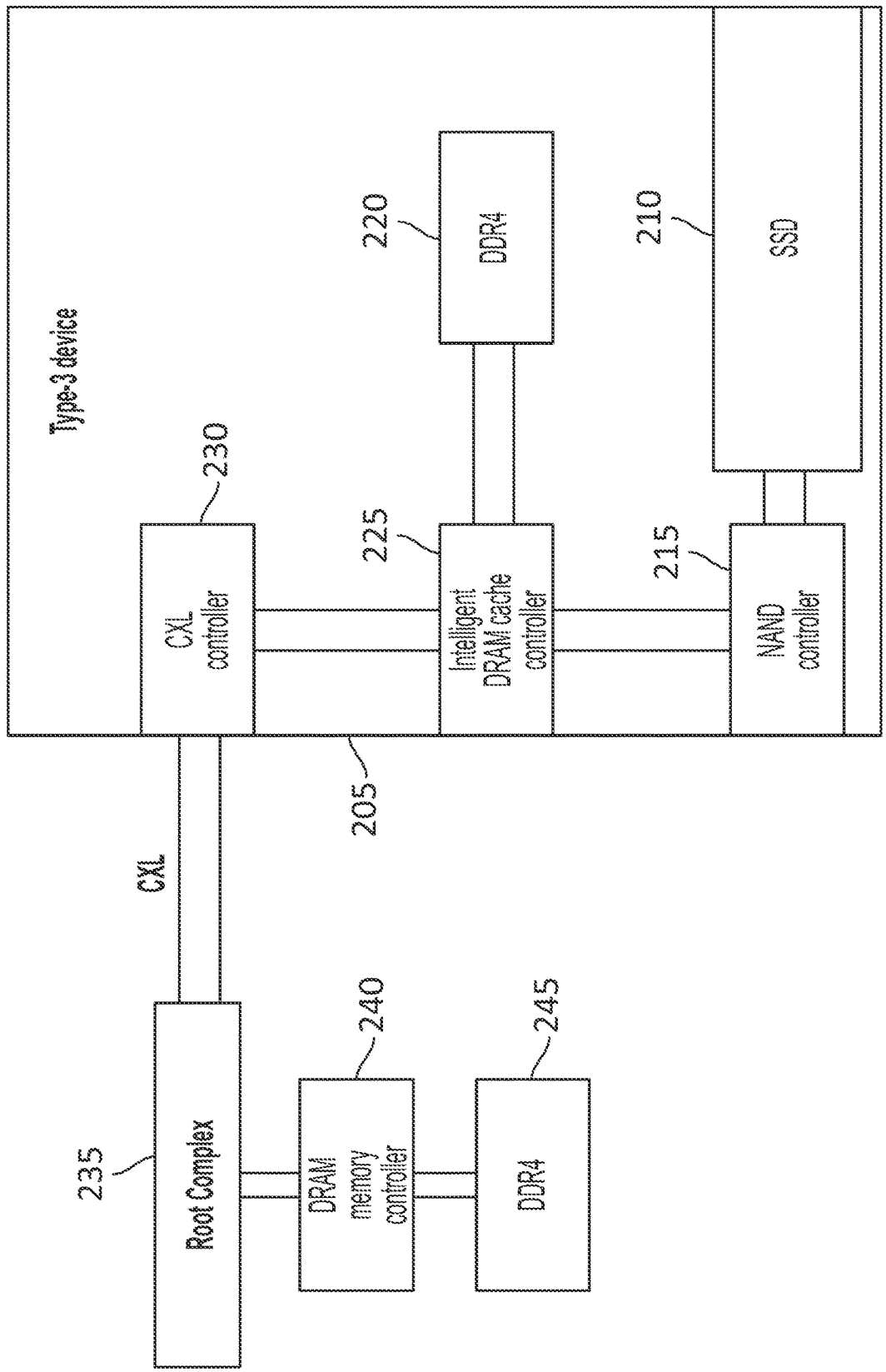
FIG. 2A is a block diagram of a memory device showing connections to external components, according to an embodiment of the present disclosure.

FIG. 2A shows a microarchitecture of a CXL memory device 205 (e.g., an internal architecture of a CXL memory device), in some embodiments. The memory device 205 includes (i) a nonvolatile memory (e.g., a solid state drive (SSD)) 210, (ii) a nonvolatile memory controller 215 connected to (and configured to interface to, and control) the nonvolatile memory 210, (iii) a volatile memory (e.g., a double data rate 4 (DDR4) memory) 220, (iv) a volatile memory controller 225 connected to (and configured to interface to, and control) the volatile memory 220, and (v) a CXL controller 230. As mentioned above, in some embodiments a cache coherent protocol different from CXL is used and a suitable cache coherent controller is used in place of the CXL controller 230. As shown in FIG. 2, the memory device 205 may be connected, through a CXL interface (e.g., through the CXL controller 230) to an external root complex 235, which may in turn be connected to a DRAM memory controller 240 and to a volatile memory (e.g., a DDR4 memory) 245. In operation, as illustrated in FIG. 2B, the memory device 205 may receive, at 260, e.g., from a host, a quality of service requirement, and it may, at 265, selectively enable a first feature in response to the quality of service requirement. The feature being enabled may be one of the features identified below.

As the amount of memory available to a host increases, certain issues, e.g., memory management problems, may arise. For example, some central processing unit (CPU) platforms may have between 1 and 10 terabytes (TB) of main memory (e.g., storage class memory (SCM), CXL memory, or low-latency NAND memory). In such a system, the boot time of the operating system (OS) may increase, in part because the host CPU may check and initialize the pages of memory during boot. Kernel metadata may occupy many gigabytes (GBs) and may hamper even smaller fast memories, and memory reclamation and defragmentation may cause significant overhead.

In some embodiments, to address such issues, a memory device may include an MMU cache. In related art systems, a translation lookaside buffer (TLB) may be provisioned inside a CPU to reduce the number of MMU accesses. A TLB miss may result in the MMU performing a physical address lookup, based on a virtual address, by accessing page tables that may be stored in host DRAM. In some embodiments, the memory device includes an MMU cache (as mentioned above) which may include a hardware (H/W) structure to cache multiple levels of the page tables. The MMU cache may maintain recent page table entries (PTEs) from upper levels of the page table hierarchy. These entries may be stored in the MMU and based on the locality of access (e.g., spatiotemporal access patterns of the physical memory addresses accessed). In such a system, an MMU cache hit may reduce the number of accesses to fewer than five.

Figure 2C:
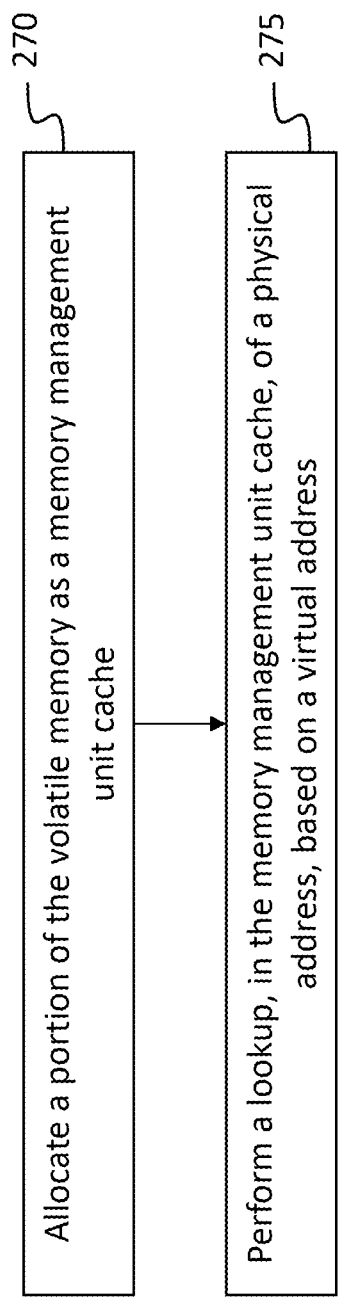
FIG. 2C is a flowchart of a method for setting up a memory management unit cache, according to an embodiment of the present disclosure.
Figure 2D:
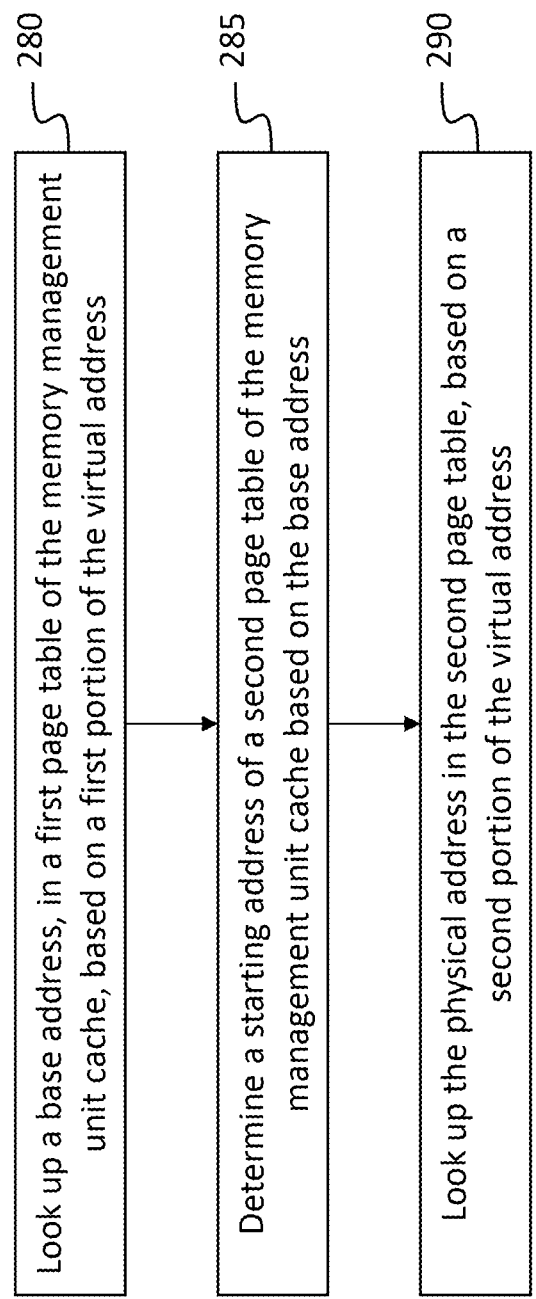
FIG. 2D is a flowchart of a method for performing a lookup, according to an embodiment of the present disclosure.

As illustrated in FIG. 2C, the memory device may, at 270, allocate a portion of the volatile memory as a memory management unit cache, and, at 275, perform a lookup, in the memory management unit cache, of a physical address, based on a virtual address. The MMU cache may include a hardware assisted translation layer to manage pages at different granularities (e.g., 4 kilobyte (KB) pages, or large pages) and to reduce random accesses. In some embodiments, the MMU cache reuses a nonuniform memory access (NUMA)-aware scheduling policy in the context of the (CXL) memory device. A host connected to, or containing, the memory device may request that the memory device perform a physical address lookup in the MMU cache. The performing of a lookup, by the memory device, in the MMU cache, may include, as illustrated in FIG. 2D, (i) looking up, at 280, a base address, in a first page table of the memory management unit cache, based on a first portion of the virtual address, (ii) determining, at 285, a starting address of a second page table of the memory management unit cache, based on the base address, and (iii) looking up, at 290, the physical address in the second page table, based on a second portion of the virtual address.

As mentioned above, in some embodiments, a memory device includes features for handling the ordering of read and write operations. Such a memory device may address the challenge that remote, disaggregated Type-3 systems (a CXL Type 3 system being, e.g., a memory expander for the host memory with CXL.io and CXL.mem) communicating over unreliable media may deliver or lose writes in an unpredictable manner. For example, CXL transactions may arrive out of order (OOO) and the received transactions may include retried transactions. In some embodiments, the memory device (i) keeps a large (time) window with time tags, and (ii) schedules and scoreboards incoming requests, each of which may be tagged with time tags applied at various points in the network (e.g., at hosts issuing read or write requests, and at switches forwarding such request), as the request is transmitted through the network. The memory device may maintain a scoreboard for all outstanding transactions and their corresponding host status. A scoreboard used for this purpose may include, for example, for each operation, a time stamp, an address, and any dependencies. The memory device may use these time tags to determine and resolve ordering on the device side. The memory device may send early completion on writes on CXL before committing the writes to the memory device. This behavior may reduce the perceived latency of the memory device. After sending an early completion, the device may be responsible for any subsequent reads and writes; the device may manage internal ordering for subsequent read operations and write operations and manage hazards. The scoreboard may be used to track the necessary states to provide this functionality (e.g., an additional field in the score board may indicate whether an operation has been committed to the memory device). The memory device may manage internal ordering for subsequent reads and writes, and manage hazards.

Figure 3A:
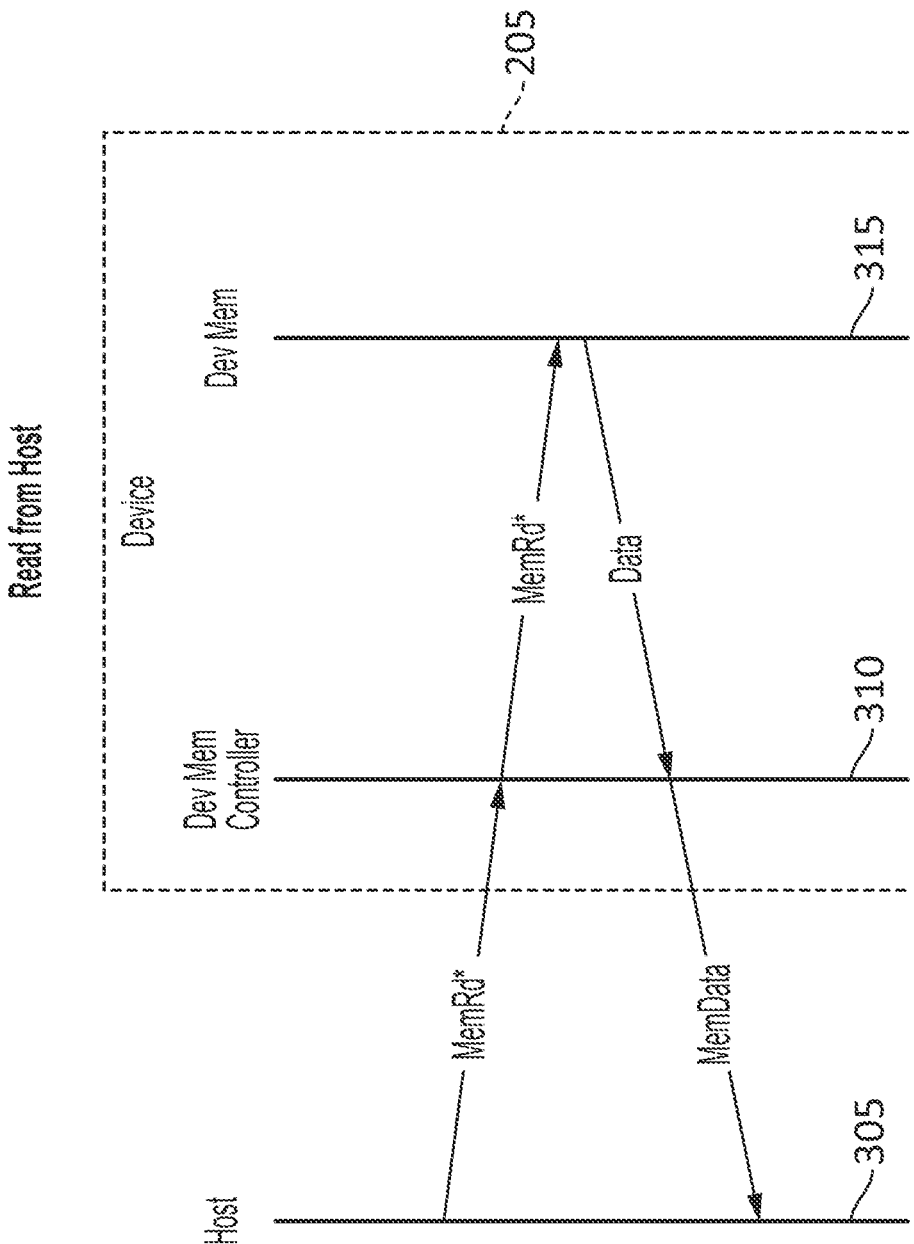
FIG. 3A is a timing diagram for a read operation, according to an embodiment of the present disclosure.
Figure 3B:
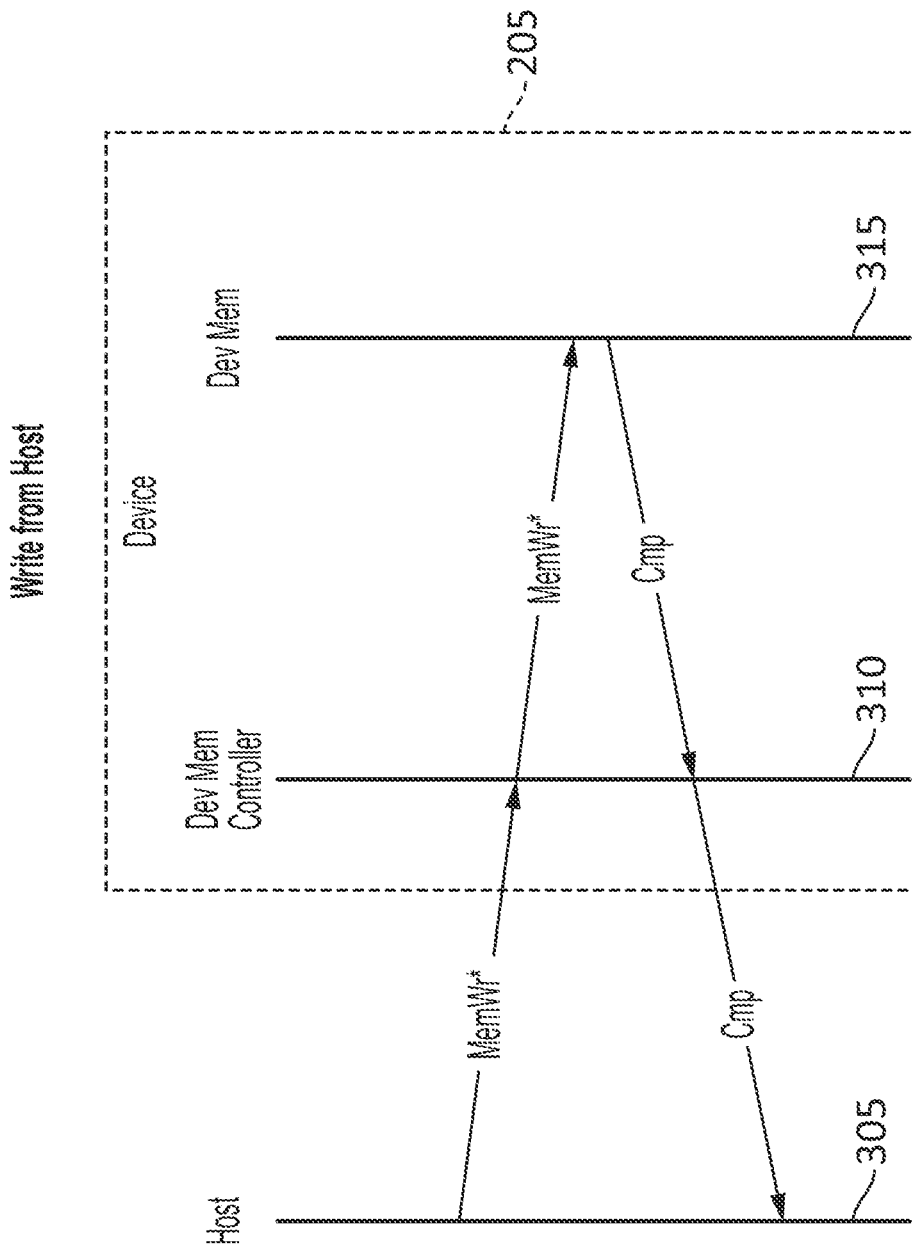
FIG. 3B is a timing diagram for a write operation, according to an embodiment of the present disclosure.

To perform hazard handling, the memory device may allow read operations that are unrelated to pending write operations to proceed. For read-after-write (RAW) operations, the memory device may serve the requested data from the scoreboard buffer. For write-after-read (WAR) operations, the memory device may ensure that any late-write operation is able to bypass earlier read operations. For write-after-write (WAW) operations, the memory device may ensure that an earlier write stays in the buffer until a time limit expires. If the memory device is a Type-2 CXL device, it may resolve dependencies to the same cacheline in the device-to-host (D2H) channel before committing the line out-of-order. FIGS. 3A and 3B are timing diagrams for a read operation and for a write operation, respectively. In FIG. 3A, a read request is sent from a host 305 to a memory controller 310 (e.g., through a CXL controller) of a memory device 205. The read operation is then performed on the device memory 315, and the data are returned to the host 305. In FIG. 3B, a write request is sent from the host 305 to the memory controller 310. The write operation is then performed on the device memory 315, and a command completion is returned to the host 305.

As mentioned above, in some embodiments, a memory device includes features for quality of service (QoS) support. The memory device may use CXL QoS telemetry features to track and report media latency and to manage tail latency within the memory device by utilizing multiple media types. The memory device may support tracking of memory utilizations, and load values may be passed, as asynchronous virtual wires, to the host for up to two memory types, which may be referred to as Type® Memory or Type1 Memory. The mapping of types may match the underlying micro-architecture configuration, e.g., Type® Memory may be Memory Class (e.g., volatile memory, such as DRAM), and Type1 Memory may be a Storage Class (e.g., nonvolatile memory or persistent memory). In some embodiments, the memory device supports MLD memory devices with separate encoding for each partition.

In some embodiments, heterogeneous Type-3 memory devices may be present in a system. CXL may allow for multiple QoS classes. The current CXL specification does not provide controls for providing bandwidth management between device QoS classes; as such, a method for "work-stealing" between DRAM and low-latency-SSDs, with separate QoS queues, may be implemented. Work stealing, for example, in a system with multiple queues, may be opportunistic taking of work (e.g., by one data processing entity from another data processing entity's queue). A data processing entity may be, for example, a processing circuit, or a software process, task or thread. Two media types may be exposed to the host and the host may submit transactions to either media. If requests to low-latency SSD are expected to be persistent, the availability of this feature may be limited.

As mentioned above, in some embodiments, a memory device includes features for MLD support. MLD may be a capability to partition a device into multiple blocks with each block providing different features (e.g., security, ECC, QoS, manageability, or availability). Such a memory device may use intelligence in a subordinate-to-master (S2M) channel to ensure that critical transactions are prioritized under severe throttling, maintain separate queues for CXL MLD devices, with each register tracking utilization to one device, and shuffle and migrate requests when the load on one device is uneven. In some embodiments, registers are used to track utilizations at configurable time-granularity. The memory device may send messages to the host using the CXL QoS application programming interface (API), with messages including, for example "light", "severe load", or "moderate". Logic in the memory device may check whether the host has throttled; otherwise it may buffer requests to a staging area while prioritizing read operations. In systems in which the upstream connection of the memory device includes a CXL switch, the memory device may contain logic to support LD-IDs and isolate the device into partitions.

As mentioned above, in some embodiments, a memory device includes features for CXL interleaving. The CXL interleave specification identifies interleave sets each of which includes way, granularity and size; the CXL interleave specification also allows multi-level interleaving. Technology-specific interleaving (e.g., bank/rank level interleaving in DRAM, or interleaving based on dies, blocks, or planes in an SSD) may be employed by the memory device, with different media types on the same module. An algorithm may be employed by the memory device to utilize interleaving as a function of chip size, the number of channels, and memory controller address mapping.

In some embodiments, the memory device implements programmable interleaving. A host-programmable interleaving ability may be implemented in the CXL memory device decoder. Multiple methods may be implemented, and the host may program the memory device using a suitable register, for example, using a CXL.io register. In some embodiments, the memory device programming may also be updated at run time, and the device may be responsible for managing outstanding transactions. Different types of interleaving may be employed across memory ranges; in such an embodiment, the memory device may look up the memory range, and the device Host-managed Device Memory (HDM) decoder may route accordingly.

In some embodiments, the memory device may manage CXL hot-add functionality and surprise-removal functionality. A ping block on each memory device may be aware of the overall system configuration using hints from a pseudo file system (such as Linux sysfs) and from the CXL device driver. In the case of volatile media, the memory device may be capable of adjusting the interleave granularity of (logical) devices underneath the memory device (multi-level interleaving) without host support, by recognizing a new topology. The memory device may track such changes and ignore requests to old media.

As mentioned above, in some embodiments, a memory device includes features for error correction code (ECC). In such an embodiment, the device may perform extensive logging of correctable errors and co-ordinate with the operating system to retire pages (e.g., when a number of correctible errors exceeds a threshold). A master module may control ECC across dynamic random access memory (DRAM), static random access memory (SRAM), compute (e.g., any computing functionality that may be present in the memory device) and low-latency SSD. For the CXL stack, the memory device may, for instance, implement the link layer, checksum, CXL flit level single-error correction and double-error detection (SECDED) and 4 KB page level Bose—Chaudhuri—Hocquenghem (BCH) code or any other suitable error correction code. The memory device logic may correct errors using such a combination of features. As used herein, a "flit" can refer to a link-level flow control unit or digit.

The memory device may signal using a CXL metafield in CXL.cache or mem response; event records may be created and managed per PCIe function level. For every correctable error, the device may signal the host via any suitable protocol such as the Message Signaled Interrupts-X (MSI-X) protocol specified in Peripheral Component Interconnect Express (PCIe) and CXL to emulate the physical interrupt lines of Peripheral Component Interconnect (PCI). To report uncorrectable errors, the memory device may use the CXL viral and poison interfaces. A device may enter viral mode when there are many uncorrectable errors, and enable the host to treat all data as suspicious. Alternatively, poison bits help the host to identify uncorrectable errors in a specific memory response.

As mentioned above, in some embodiments, a memory device includes support for integrity and data encryption (IDE). As non-volatile memory is supported in the main memory domain, a memory device may use strong cryptographic algorithms. In some embodiments, a memory device implements a Secure Hash Algorithms (SHA) cipher or an Advanced Encryption Standard (AES) cipher inside the memory device for security. For example, the memory device may (i) receive unencrypted data, encrypt it, and store the encrypted data in nonvolatile memory, or it may (ii) read encrypted data from nonvolatile memory, decrypt it, and transmit the decrypted data through the CXL controller. The host may choose the algorithm, or configure the device at run time using the CXL.io command registers. Private keys may be exchanged using CXL.io at boot time during CXL End-point enumeration. The memory device may create multiple trust zones; such multiple trust zones may provide a variety of tradeoffs between trust and performance. A trust zone may be a region in memory in which a specific type of encryption is employed and only certain authorized hosts or originators are granted access. The memory device may also control different modes of internal scrambling and address swizzling per trust-zone.

Figure 4A:
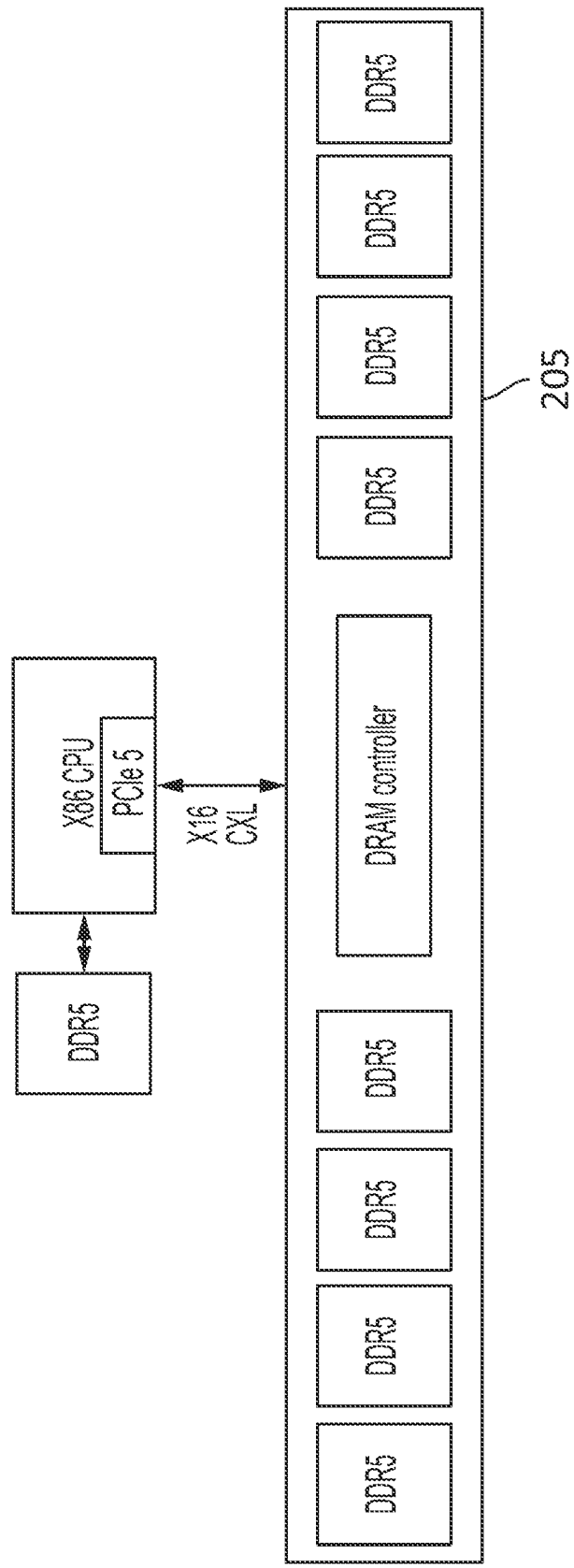
FIG. 4A is a block diagram of a first memory device microarchitecture, according to an embodiment of the present disclosure.
Figure 4B:
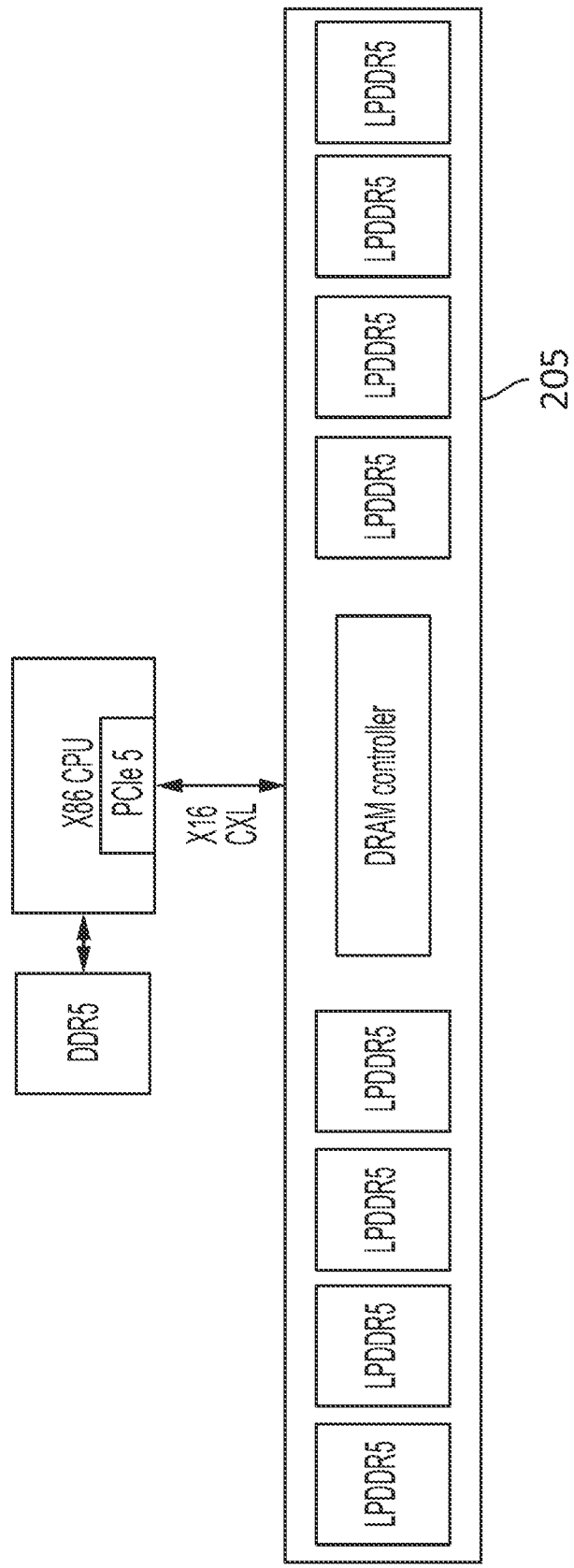
FIG. 4B is a block diagram of a second memory device microarchitecture, according to an embodiment of the present disclosure.
Figure 4C:
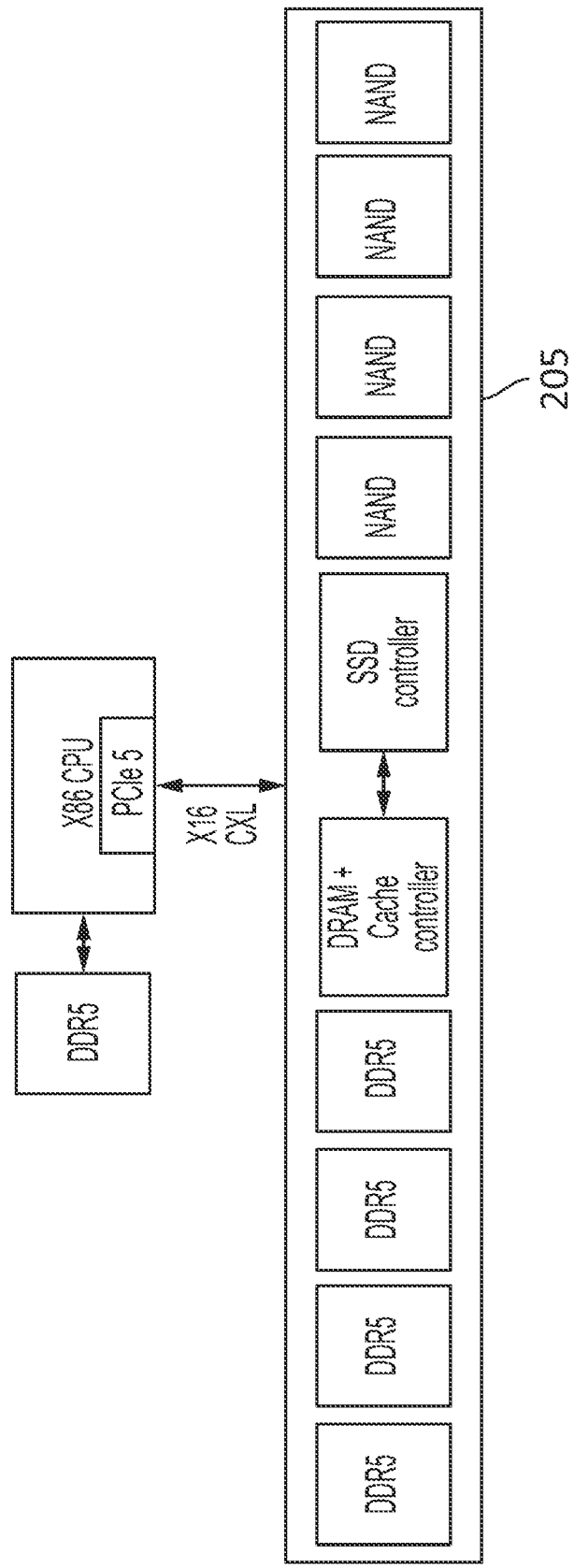
FIG. 4C is a block diagram of a third memory device microarchitecture, according to an embodiment of the present disclosure.
Figure 4D:
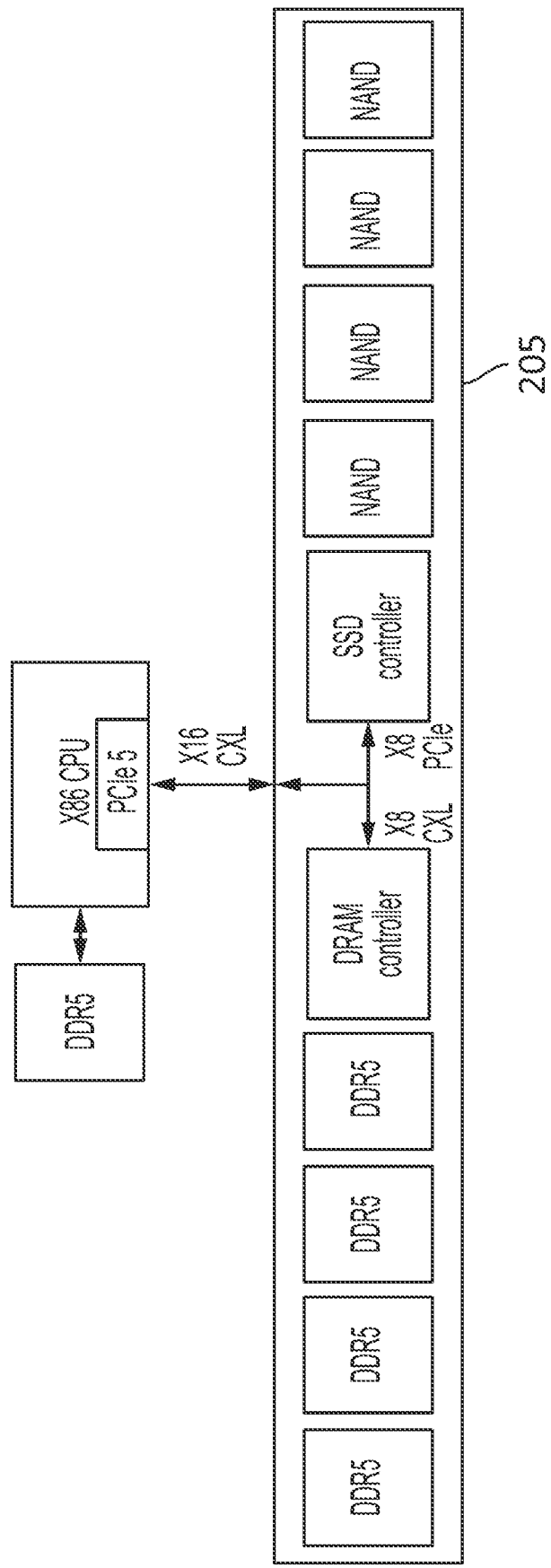
FIG. 4D is a block diagram of a fourth memory device microarchitecture, according to an embodiment of the present disclosure.

In some embodiments, various approaches to collocating different memory or storage technologies in a single CXL device, as illustrated, for some examples, in FIGS. 4A-4D. FIGS. 4A-4D show several memory device microarchitectures. FIG. 4A shows a microarchitecture including only double data rate 5 (DDR5) or double data rate 4 DDR4 memory (FIG. 4A), or low power double data rate 5 (LPDDR5)) DRAM memory (FIG. 4B). Such a memory device includes the DRAM memory and a memory controller (MC). Such an embodiment may focus on decoding and interleaving. FIGS. 4C and 4D show a microarchitecture including DDR memory and low-latency NAND memory. Such an embodiment may have a split interface to the two media (as shown in FIG. 4D, with an 8-lane CXL interface to the DDR memory, and an 8-lane PCIe interface to the low-latency NAND memory) or a dedicated interface to the two media (FIG. 4C).

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X−Y and the second quantity is at most X+Y. As used herein, when a second number is "within Y %" of a first number, it means that the second number is at least (1−Y/100) times the first number and the second number is at most (1+Y/100) times the first number. As used herein, the term "or" should be interpreted as "and/or", such that, for example, "A or B" means any one of "A" or "B" or "A and B".

The background provided in the Background section of the present disclosure section is included only to set context, and the content of this section is not admitted to be prior art. Any of the components or any combination of the components described (e.g., in any system diagrams included herein) may be used to perform one or more of the operations of any flow chart included herein. Further, (i) the operations are example operations, and may involve various additional steps not explicitly covered, and (ii) the temporal order of the operations may be varied.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. As used herein, "means for data storage" means volatile memory or nonvolatile memory, or a combination thereof.

Although exemplary embodiments of a coherent memory system have been specifically described and illustrated herein, many modifications and variations will be apparent to those skilled in the art. Accordingly, it is to be understood that a coherent memory system constructed according to principles of this disclosure may be embodied other than as specifically described herein. The invention is also defined in the following claims, and equivalents thereof.

What is claimed is:

1. A system, comprising:
   a first memory device, the first memory device comprising:
      a cache coherent controller connected to a processing circuit over a cache coherent interface;
      a volatile memory controller;
      a volatile memory;
      a nonvolatile memory controller; and
      a nonvolatile memory,
   wherein the first memory device is configured:
      to receive a quality of service requirement; and
      to selectively enable a first feature in response to the quality of service requirement;
   wherein the cache coherent interface is configured to transport a first data packet between the processing circuit and the volatile memory via the cache coherent controller, and is further configured to transport a second data packet between the processing circuit and the nonvolatile memory via the cache coherent controller,
   wherein the cache coherent controller is configured to translate at least the first data packet that is based on an interface of the volatile memory to a data packet that is based on the cache coherent interface,
   wherein the first feature comprises a memory management unit cache in the first memory device; and
   the first memory device is configured to:
      allocate a portion of the volatile memory as the memory management unit cache, and
      perform a physical address lookup, in the memory management unit cache, of a physical address, based on a virtual address.

2. The system of claim 1, wherein performing the physical address lookup comprises:
   looking up a base address, in a first page table of the memory management unit cache, based on a first portion of the virtual address;
   determining a starting address of a second page table of the memory management unit cache based on the base address; and
   looking up the physical address in the second page table, based on a second portion of the virtual address.

3. The system of claim 1, further comprising a host, wherein:
   the host comprises:
      a memory management unit, and
      a translation lookaside buffer; and
   the host is configured to request, from the first memory device, the physical address lookup.

4. The system of claim 1, wherein the first memory device is further configured:
   to receive:
      a first IO request, the first IO request comprising a first time tag indicating a time of issuance of the first IO request, and
      a second IO request, the second IO request comprising a time tag indicating a time of issuance of the second IO request; and
   to execute:
      the second IO request, and
      the first IO request,
   wherein the time tag of the second IO request is less than the first time tag of the first IO request.

5. The system of claim 4, wherein the first IO request further comprises a second time tag indicating a time of processing of the first IO request by a switch.

6. The system of claim 1, wherein:
   the first memory device comprises a first media type; and
   the first memory device is further configured to report, through the cache coherent controller, a load value for the volatile memory.

7. The system of claim 6, wherein:
   the volatile memory is mapped to a first logical device,
   the nonvolatile memory is mapped to a second logical device, and
   the first memory device is further configured to report, through the cache coherent controller, a load value for the nonvolatile memory.

8. The system of claim 1, further comprising a second memory device, wherein:

the first memory device is configured to store:
first data having a first physical address, and
second data having a second physical address; and
the second memory device is configured to store:
third data having a third physical address,
the third physical address being greater than the first physical address and less than the second physical address.

9. The system of claim 1, wherein the first memory device is further configured to:
receive a read request;
read raw data from a first page;
decode the raw data, with an error correcting code;
determine that a number of errors corrected exceeds a threshold; and
send, through the cache coherent controller, a report requesting retirement of the first page.

10. The system of claim 1, wherein the first memory device is further configured to:
receive a write request comprising unencrypted data;
encrypt the unencrypted data to form encrypted data; and
store the encrypted data in the nonvolatile memory.

11. The system of claim 1, wherein the first memory device is further configured to:
receive a read request;
read encrypted data from the nonvolatile memory;
decrypt the encrypted data to form unencrypted data; and
transmit the unencrypted data through the cache coherent controller.

12. The system of claim 1, wherein the cache coherent controller is a Compute Express Link (CXL) controller.

13. The system of claim 11, wherein the first memory device is a Type-3 CXL device.

14. A system, comprising:
a first memory device, the first memory device comprising:
a cache coherent host interface;
a cache coherent controller connected to a processing circuit over the cache coherent host interface;
a volatile memory controller;
a volatile memory;
a nonvolatile memory controller; and
a nonvolatile memory,
the first memory device being configured to:
allocate a portion of the volatile memory as a memory management unit cache; and
perform a lookup, in the memory management unit cache, of a physical address, based on a virtual address,
wherein the cache coherent host interface is configured to transport a first data packet between the processing circuit and the volatile memory via the cache coherent controller, and is further configured to transport a second data packet between the processing circuit and the nonvolatile memory via the cache coherent controller;
wherein the cache coherent controller is configured to translate at least the first data packet that is based on an interface of the volatile memory to a data packet that is based on the cache coherent host interface.

15. A method, comprising:
receiving, by a first memory device, a quality of service requirement;
selectively enabling a first feature in response to the quality of service requirement,
wherein the first memory device comprises:
a cache coherent controller connected to a processing circuit over a cache coherent interface;
a volatile memory controller;
a volatile memory;
a nonvolatile memory controller; and
a nonvolatile memory,
wherein the cache coherent interface is configured to transport a first data packet between the processing circuit and the volatile memory via the cache coherent controller, and is further configured to transport a second data packet between the processing circuit and the nonvolatile memory via the cache coherent controller,
wherein the cache coherent controller translates at least the first data packet that is based on an interface of the volatile memory to a data packet that is based on the cache coherent interface;
allocating, by the first memory device, a portion of the volatile memory as a memory management unit cache; and
performing, by the first memory device, a lookup, in the memory management unit cache, of a physical address, based on a virtual address.

16. The method of claim 15, wherein the performing of the lookup comprises:
looking up a base address, in a first page table of the memory management unit cache, based on a first portion of the virtual address;
determining a starting address of a second page table of the memory management unit cache based on the base address; and
looking up the physical address in the second page table, based on a second portion of the virtual address.

17. The method of claim 15, further comprising:
receiving:
a first IO request, the first IO request comprising a first time tag indicating a time of issuance of the first IO request, and
a second IO request, the second IO request comprising a time tag indicating a time of issuance of the second IO request; and
executing:
the second IO request, and
the first IO request,
wherein the time tag of the second IO request is less than the first time tag of the first IO request.

18. The method of claim 17, wherein the first IO request further comprises a second time tag indicating a time of processing of the first IO request by a switch.

* * * * *